US008721133B2

(12) United States Patent
Muccianti

(10) Patent No.: US 8,721,133 B2
(45) Date of Patent: May 13, 2014

(54) CURCUBIT LANTERN DEVICE

(76) Inventor: Dan Muccianti, Hartland, WI (US)

( * ) Notice: Subject to any disclaimer, the term of this patent is extended or adjusted under 35 U.S.C. 154(b) by 575 days.

(21) Appl. No.: 12/768,539

(22) Filed: Apr. 27, 2010

(65) Prior Publication Data

US 2011/0261560 A1 Oct. 27, 2011

(51) Int. Cl.
*B60Q 1/00* (2006.01)

(52) U.S. Cl.
USPC .......................................... 362/368; 362/119

(58) Field of Classification Search
USPC ......... 362/368, 119, 122, 612, 351, 392, 276, 362/190
See application file for complete search history.

(56) References Cited

U.S. PATENT DOCUMENTS

| | | | | |
|---|---|---|---|---|
| D298,060 | S | 10/1988 | Johannsen | |
| 4,955,807 | A | 9/1990 | Chance et al. | |
| D317,700 | S | 6/1991 | Callahan | |
| 5,274,537 | A | 12/1993 | Altman | |
| 5,526,243 | A | 6/1996 | Masters | |
| 5,629,057 | A | 5/1997 | Wang et al. | |
| 5,791,774 | A | 8/1998 | Briles | |
| D400,406 | S | 11/1998 | House | |
| D403,461 | S | 12/1998 | Friedmann | |
| 5,918,964 | A | 7/1999 | Bou | |
| 6,000,820 | A | 12/1999 | Murray | |
| 6,106,279 | A | 8/2000 | Hedlund | |
| 6,145,795 | A | 11/2000 | McAdam | |
| 6,199,818 | B1 | 3/2001 | Tsappi | |
| 6,309,092 | B1 | 10/2001 | Bardeen et al. | |
| 6,422,525 | B1 | 7/2002 | McAdam et al. | |
| 6,513,945 | B1 | 2/2003 | Wyss et al. | |
| 6,527,544 | B1 | 3/2003 | Salter et al. | |
| 6,540,371 | B2 | 4/2003 | Franks | |
| 6,546,654 | B1 | 4/2003 | Henson | |
| 6,554,443 | B2 | 4/2003 | Fan | |
| 6,575,613 | B2 | 6/2003 | Brown et al. | |
| 6,578,710 | B1 | 6/2003 | Brown et al. | |
| 6,629,770 | B2 | 10/2003 | Blatherwick | |
| 6,705,741 | B2 | 3/2004 | Bonnema et al. | |
| 6,869,200 | B1 | 3/2005 | Graham | |
| D530,846 | S | 10/2006 | Izardel | |
| 7,237,922 | B2 | 7/2007 | Cayton | |
| 7,308,968 | B2 | 12/2007 | Denison | |
| 7,311,414 | B2 | 12/2007 | Norton et al. | |
| 7,422,355 | B2 | 9/2008 | Hirata | |
| 2005/0174784 | A1 | 8/2005 | Conrey | |
| 2005/0248952 | A1 * | 11/2005 | Yao et al. | 362/392 |
| 2006/0176703 | A1 | 8/2006 | Cayton et al. | |
| 2008/0105817 | A1 * | 5/2008 | Damman | 248/684 |
| 2008/0310149 | A1 | 12/2008 | Chan | |

* cited by examiner

*Primary Examiner* — Anne Hines
(74) *Attorney, Agent, or Firm* — Boardman & Clark LLP; Joseph W. Byrne

(57) ABSTRACT

The present invention is a light apparatus comprised of a housing, which forms a contoured surface plate having a lower surface and an upper surface adapted to receive a carved cucurbit; at least one socket adapted to receive a light bulb so that the light bulb is positioned perpendicular to said upper surface of said contoured face plate; at least one power source component operatively coupled to the socket, and at least one spiked member adapted to pierce and secure the carved cucurbit.

27 Claims, 7 Drawing Sheets

CURCUBIT LANTERN DEVICE

FIELD OF INVENTION

The present invention relates to the field of lamps, and in particular, to a lantern which uses a carved cucurbit housing to encase the light source.

GLOSSARY

Figure 1A:
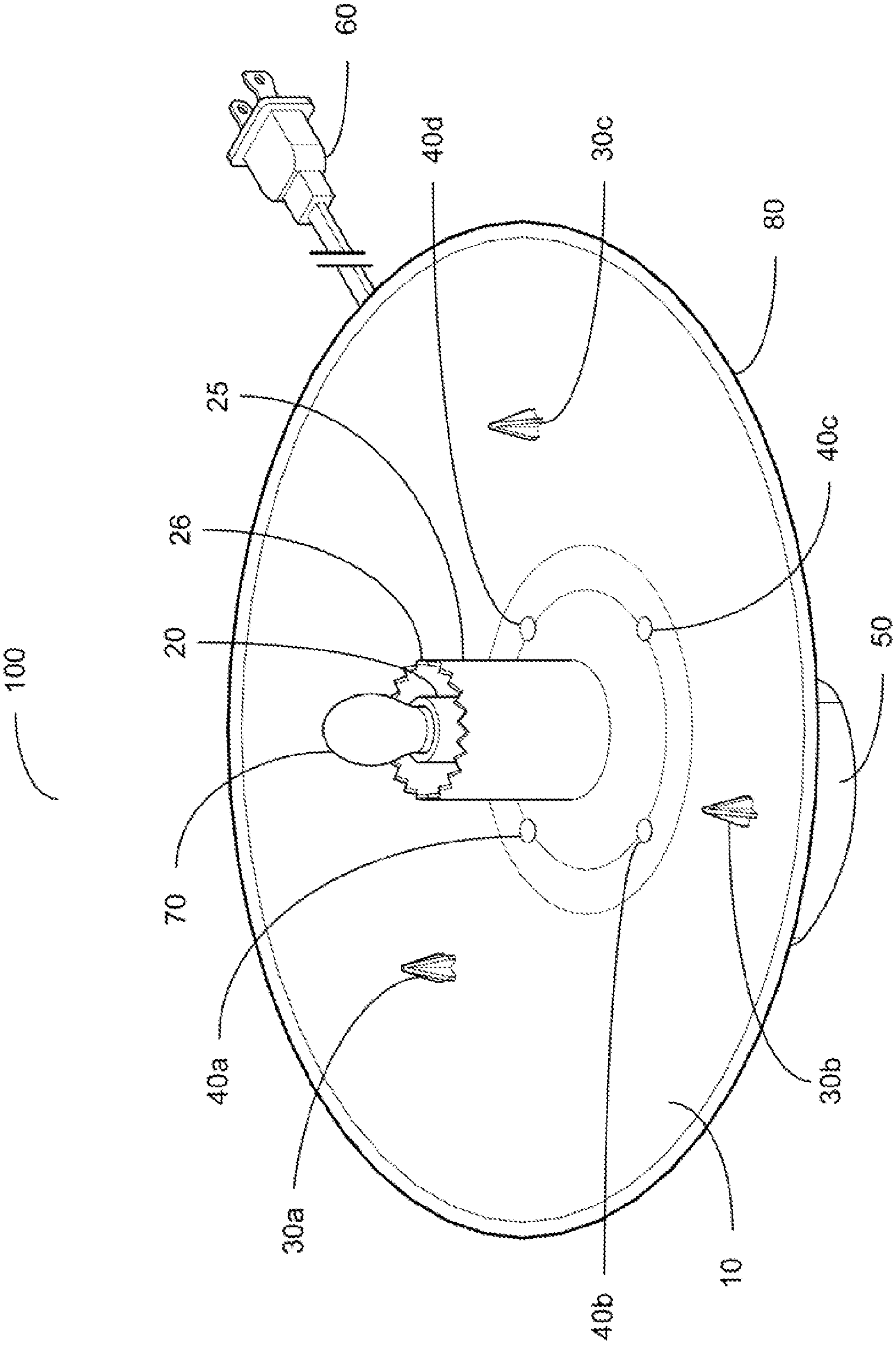
FIGS. 1*a* and 1*b* illustrate perspective views of a cucurbit lantern device.

As used herein, the term "cucurbit" refers to various plants of the family Cucurbitaceae, which includes the squash, pumpkin, cucumber, gourd, watermelon and cantaloupe. As used herein, a cucurbit includes a synthetic cucurbit.

As used herein, the term "socket" refers to a component adapted to conduct electricity and/or make an electrical connection between a light bulb or any other component and a power source.

As used herein, the term "power source" refers to an electrical source, a battery and/or a solar energy storage device.

As used herein, the term "integrally constructed" means molded as a single unit or fixedly attached.

As used herein, the term "base component" refers to a component which raises the lower surface of a contoured surface plate off of the supporting surface. A base component may include, but is not limited to a single base component, a plurality of columns, feet, pegs, felt, fabric or any other structure known in the art for lifting a contoured surface plate. A base component may or may not be integrally constructed with the contoured surface plate, and may further be adapted for stacking or transport.

As used herein, the term "structural support ridge" refers to a ridge on the outer edge of a component that adds structural support to the component.

As used herein, the term "selectively attachable" means removable for use. A selectively attachable component may be tethered, contoured for attachment, or fastened or mounted in an unsecured manner.

As used here, the term "lamp" refers to a portable device that generates light and has a casing for enclosing a light source.

As used herein, the term "casing" means a component that encases a light source and/or other electrical components.

BACKGROUND

Approximately $1.5 billion of revenue is earned from pumpkin sales each year, most of which spent on pumpkins for ornamental use.

Pumpkins have a hard, rounded shell, which enables them to be easily carved. Traditionally, pumpkins are carved and illuminated, but other gourds and shelled fruits, such as watermelons, gourds, squash, etc. (known as "cucurbits") are also susceptible for carving, illumination and ornamental use.

Pumpkins are traditionally illuminated with candles or other lighting. Candles, particularly tea lights, are one of the most common ways to light a jack-o'-lantern. Candles present a fire hazard, and need to be replaced frequently. Candles are often also a weaker light source and may be extinguished by wind or rain.

There have been numerous attempts in the prior art to design an alternative light system for illuminating a jack-o'-lantern. One example is taught by U.S. patent application Ser. No. 10/772,475 (Conrey '475).

SUMMARY OF THE INVENTION

The present invention is a light apparatus comprised of a housing, which forms a contoured surface plate having a lower surface and an upper surface adapted to receive a carved cucurbit; at least one socket adapted to receive a light bulb so that the light bulb is positioned perpendicular to said upper surface of said contoured face plate; at least one power source component operatively coupled to the socket, and at least one spiked member adapted to pierce and secure the carved cucurbit.

In various embodiments, additional components, such as a base, feet, structural supports, multiple lighting components, audio components, insect repellent and other components may be included.

DETAILED DESCRIPTION OF INVENTION

For the purpose of promoting an understanding of the present invention, references are made in the text to exemplary embodiments of a cucurbit lantern device, only some of which are described herein. It should be understood that no limitations on the scope of the invention are intended by describing these exemplary embodiments. One of ordinary skill in the art will readily appreciate that alternate but functionally equivalent components, materials and configurations may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

Figure 1B:
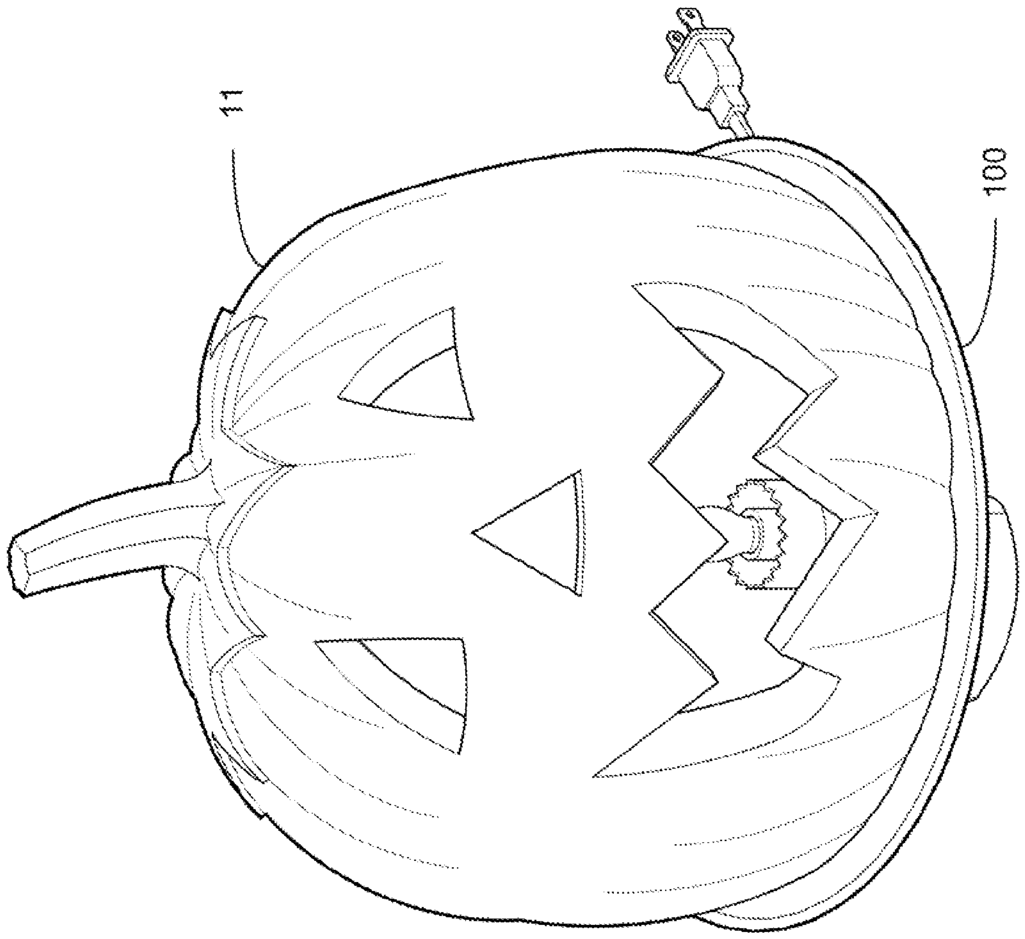

FIGS. 1*a* and 1*b* illustrates a perspective view of one exemplary embodiment of cucurbit lantern device 100 for illuminating a jack-o'-lantern. FIG. 1*b* illustrates carved cucurbit 11 mounted on cucurbit lantern device 100. As illustrated in FIG. 1*a*, cucurbit lantern device 100 is comprised of contoured support plate 10 having an upper and lower surface, cutting tool 25, socket 20, feet 50 and power source 60.

Also visible in FIG. 1*a* is light source 70, is a 7-watt bulb. Other embodiments may have fewer or more light sources, and lights sources of varying wattage and types. For example, in alternative embodiments light source 70 may be an LED, incandescent or compact fluorescent light. In varying embodiments, the color and/or features of the light bulb may vary. For example, the bulb may flicker to mimic a candle and/or be placed on a timer. In the embodiment shown, cucurbit lantern device 100 may be used indoors or outdoors.

Still other embodiments may include further mechanical features, such as audio, motion detector and insect repelling components.

In the embodiment shown, contoured support plate 10 is slightly concave and further includes spiked members 30*a*, 30*b*, and 30*c* and drainage holes 40*a*, 40*b*, 40*c*, and 40*d*. In the embodiment shown, contoured support plate 10 further includes structural support ridge 80 which strengthens contoured support plate 10.

Cutting tool 25 has a serrated circumferential edge 26 or other cutting edge for cutting into cucurbit 11 (e.g., a pumpkin). Cutting tool 25 may be selectively removed from contoured support plate 10 and pressed into the bottom of cucurbit 11 to create a hole having the desired dimensions for inserting cucurbit 11 over light 70.

In the embodiment shown, spiked members 30*a*, 30*b*, and 30*c* are located approximately 2¼ inches from the edge of contoured support plate 10, are approximately ⅜ inches wide at the base, and taper to an approximately ⅛ inch point on top. Spiked members 30*a*, 30*b*, and 30*c* are used to secure a carved cucurbit on contoured support plate 10.

In the embodiment shown, socket 20 has a diameter of approximately ¾ inches and cutting tool 25 has a diameter of approximately 1⅜ inches and a height of approximately 2 inches, but may be of any height or width. In the embodiment shown, contoured support plate 10 is approximately ¼ inch thick in the center and tapers to a thickness of approximately 3/16 inches at the outer edge. The ground clearance as the center of contoured support plate 10 is approximately ½ inches with an increasing ground clearance as contoured support plate 10 concaves inward.

In various other embodiments, contoured support plate 10 may have more or fewer spiked members 30*a*, 30*b*, and 30*c* and/or drainage holes 40*a*, 40*b*, 40*c*, and 40*d* or have spiked members 30*a*, 30*b*, and 30*c* and/or drainage holes 40*a*, 40*b*, 40*c*, and 40*d* of varying sizes, shapes and locations.

In the embodiment shown, contoured support plate 10, feet 50, and spiked members 30*a*, 30*b*, and 30*c* are singly molded from a semi-flexible plastic, and cutting tool 25 is formed from a hard plastic. In an exemplary embodiment, cucurbit lantern device 100 is reusable and dishwasher safe.

Still other embodiments may include ornamental components for piercing the surface of said cucurbit to create apertures through which light is emitted and refracted.

Figure 2:
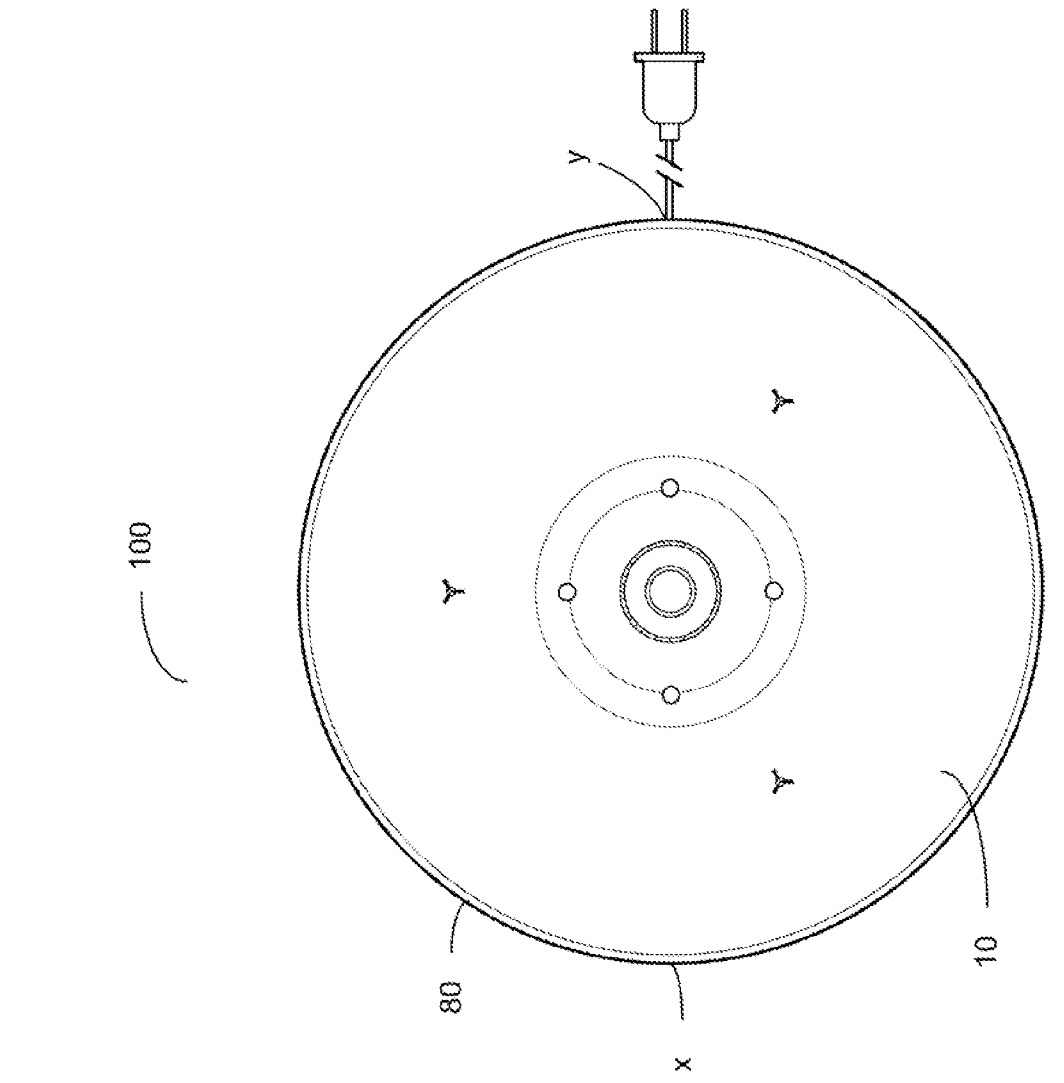
FIG. 2 illustrates a top view of one component a cucurbit lantern device.

FIG. 2 illustrates a top view of a cucurbit lantern device 100. In the exemplary embodiment shown, upper surface includes points x and y, which represent the highest points from the center of contoured surface plate 10. In various embodiments, the distance from points x and y to each other and from the center (i.e., the depth of contoured surface plate 10 may be increased or decreased so that cucurbit lantern device 100 may be adapted for various size cucurbits. The ground clearance and height of center protuberance may also vary. In the exemplary embodiment shown, cucurbit lantern device is adapted to hold a 30-pound pumpkin or other cucurbit.

Figure 3:
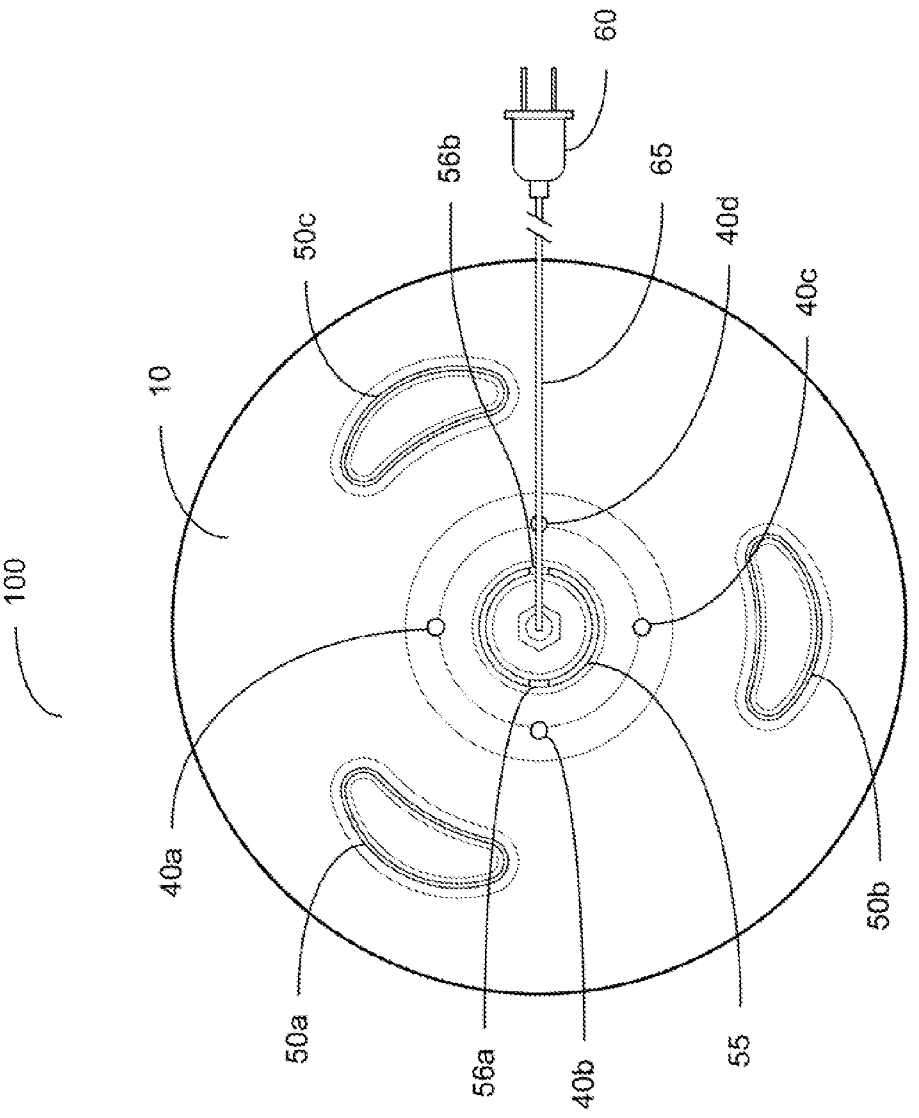
FIG. 3 illustrates a bottom view of a cucurbit lantern device.

FIG. 3 illustrates a bottom view of a cucurbit lantern device 100. In the embodiment shown, feet 50*a*, 50*b*, and 50*c* are located centered directly below spiked members 30*a*, 30*b*, and 30*c* (not visible). In the embodiment shown, feet 50*a*, 50*b*, and 50*c* are crescent shaped, but in other embodiments may be round, square, oval or any other shape.

In the embodiment shown, cucurbit lantern device 100 has a 6-foot electrical cord, which is coupled to socket 20; however, in other embodiments, the length of cord may vary or light 70 may be powered by an alternate power source, such as a battery. In various embodiments, cucurbit lantern device may have a switch or remote control component.

Figure 4:
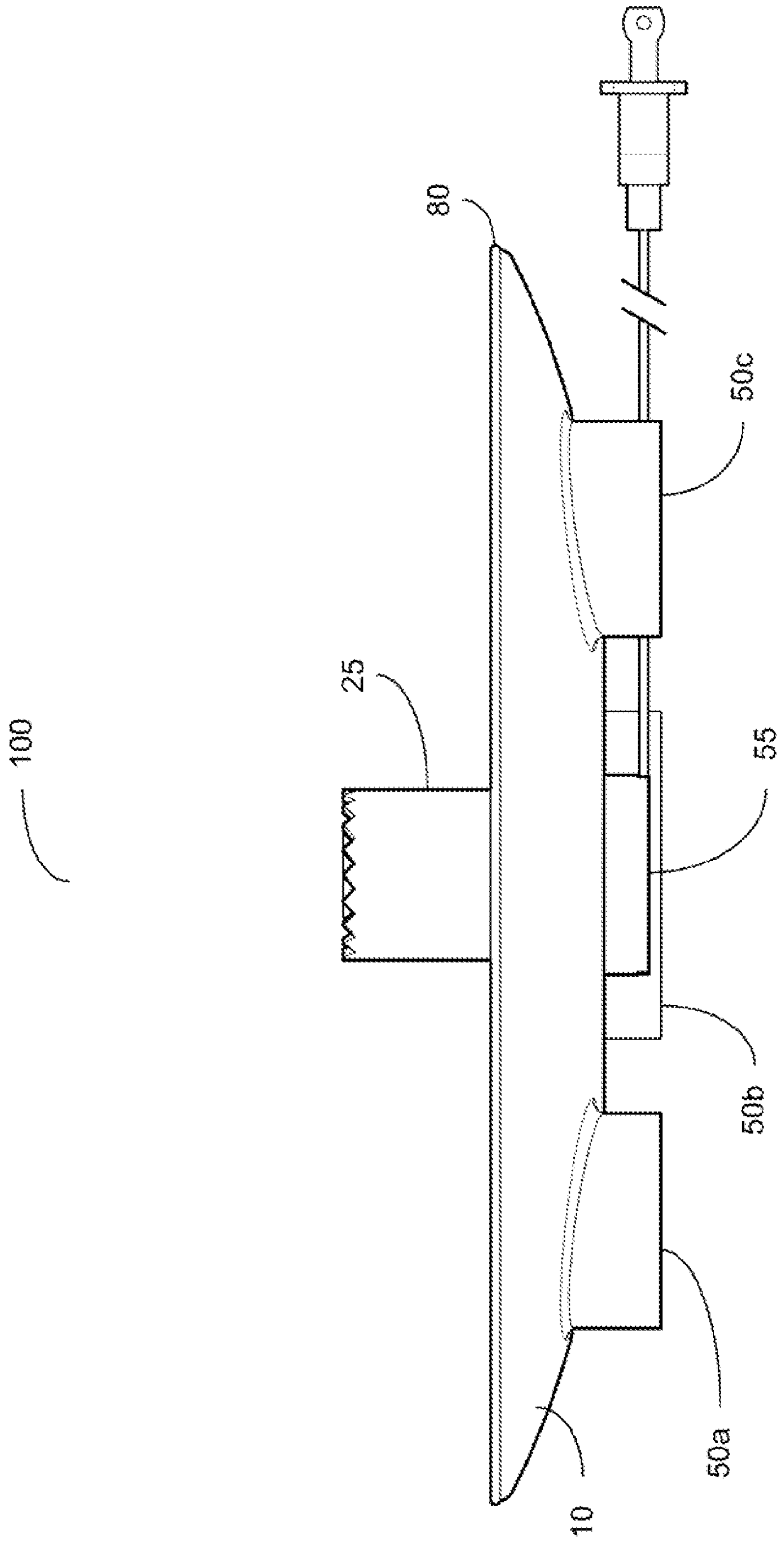
FIG. 4 illustrates a side view of a cucurbit lantern device.

FIG. 4 illustrates a side view of a cucurbit lantern device 100 showing contoured support plate 10, structural support ridge 80, cutting tool 25, base component 55, and feet 50*a*, 50*b*, and 50*c*.

Figure 5A:
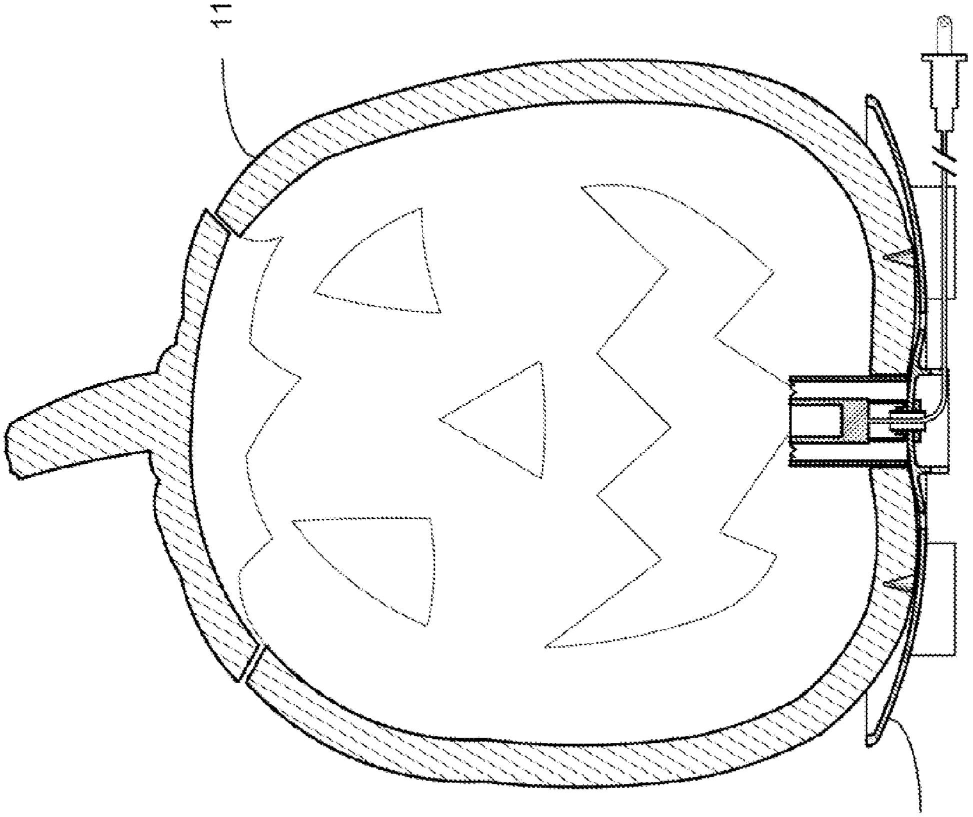
FIGS. 5*a* and 5*b* illustrate sectional views of a cucurbit lantern device.
Figure 5B:
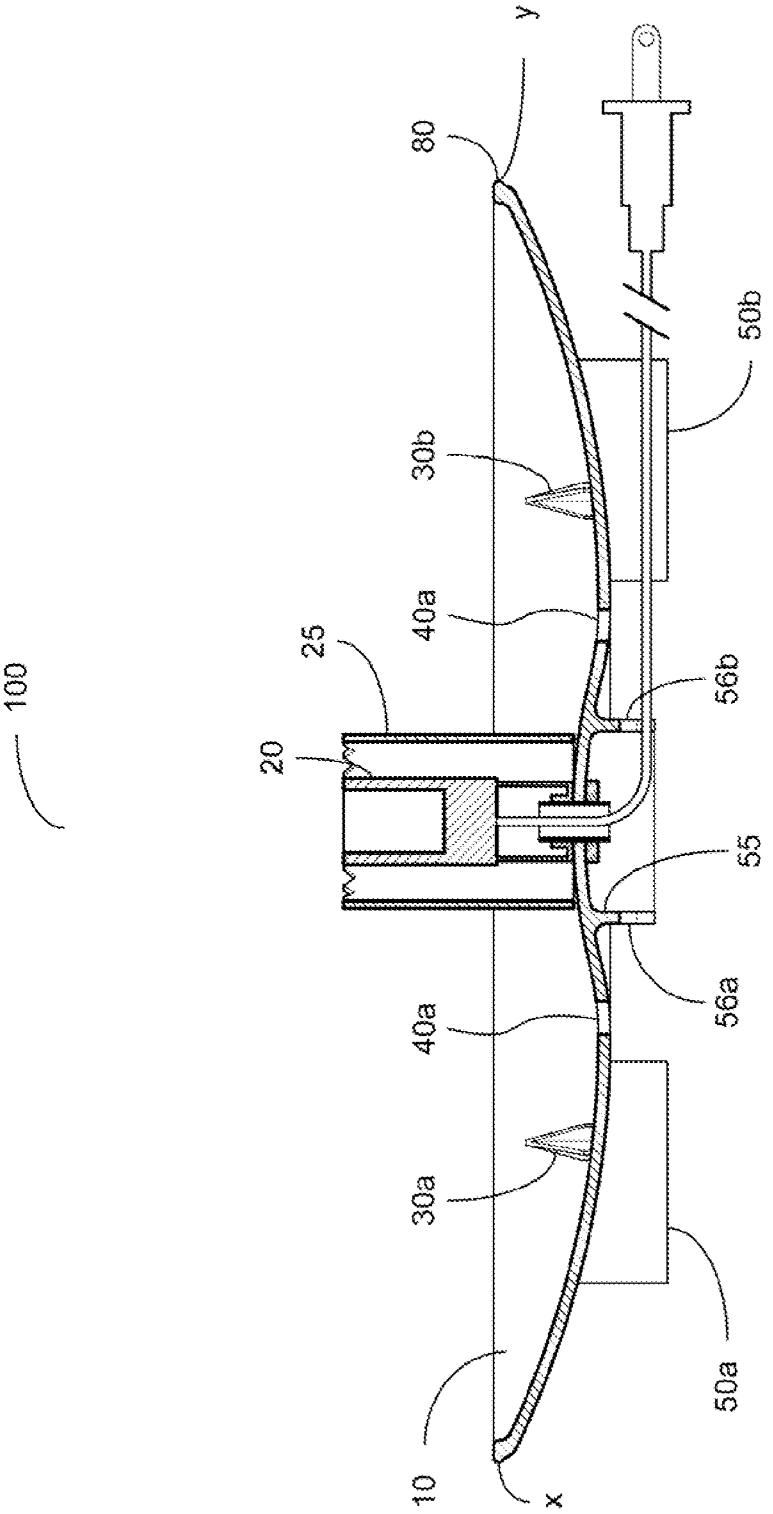

FIGS. 5*a* and 5*b* illustrate sectional views of a cucurbit lantern device 100. FIG. 5*a* further illustrates the functionality of cucurbit 11 as a housing for light source 70.

What is claimed is:

1. A lantern for use with a carved cucurbit having a top and a bottom, the lantern comprised of:

a housing forming a contoured surface plate having an upper surface and a lower surface, said contoured surface plate adapted to supported said carved cucurbit on said upper surface;

a socket adapted to receive a light source, said socket being secured to said contoured surface plate, said socket being positioned perpendicular to said upper surface of said contoured surface plate, said socket further being secured and positioned for insertion up-through a hole in said bottom of said carved cucurbit when said carved cucurbit is being supported on said upper surface of said contoured surface plate;

at least one power source component electrically coupled to said socket; and at least one spiked member adapted to pierce and secure said carved cucurbit on said upper surface of said contoured surface plate.

2. The apparatus of claim 1 which further includes a cutting tool selectively attached to said contoured surface plate and configured to be removed from said contoured surface plate to cut said hole in said bottom of said carved cucurbit for insertion of said socket.

3. The apparatus of claim 2 wherein said socket is disposed inside of said cutting tool when said cutting tool is selectively attached to said contoured surface plate.

4. The apparatus of claim 3 wherein said cutting tool and said socket are not attached to one another.

5. The apparatus of claim 2 wherein said cutting tool can be removed for use from said contoured surface plate without removing said socket from said contoured surface plate.

6. The apparatus of claim 2 wherein said cutting tool and said socket are separate structures, each of which is attachable to said contoured surface plate independent of the other.

7. The apparatus of claim 1 further including a cutting tool, wherein said socket is disposed inside of said cutting tool.

8. The apparatus of claim 1 wherein the at least one power source component is an electrical cord electrically coupled to said socket.

9. The apparatus of claim 1 wherein the at least one power source component is disposed to provide power to the socket through the hole in said bottom of said carved cucurbit.

10. An apparatus for use with a carved cucurbit having a top and a bottom, the apparatus comprising:

a support plate configured to support the bottom of the carved cucurbit thereon, the support plate having an upper surface and a lower surface;

an electrical socket configured to receive a light source, wherein the socket is attached to the support plate, and further wherein the socket is disposed to be received up-through a hole in the bottom of the carved cucurbit when the carved cucurbit is being supported on the support plate.

11. The apparatus of claim 10 further comprising a cutting tool selectively attached to the support plate, the cutting tool adapted to cut the hole in the bottom of the carved cucurbit for receiving the socket.

12. The apparatus of claim 11 wherein the cutting tool is selectively attached to the support plate around the socket such that when the carved cucurbit is being supported on the support plate, both the cutting tool and the socket are received up-through the hole in the bottom of the carved cucurbit.

13. The apparatus of claim 12 wherein the cutting tool and the socket are not attached to each other.

14. The apparatus of claim 11 wherein the cutting tool can be removed for use from the support plate without removing the socket from the support plate.

15. The apparatus of claim 11 wherein the cutting tool and the socket are separate structures, each of which is attachable to the support plate independent of the other.

16. The apparatus of claim 10 further comprising at least one spiked member adapted to pierce and secure the carved cucurbit on the support plate.

17. The apparatus of claim 10 further comprising at least one power source, the power source configured to be operatively coupled to the socket.

18. The apparatus of claim 10 further comprising a cutting tool disposed around the socket.

19. The apparatus of claim 10 further comprising a power source component electrically coupled to the socket.

20. The apparatus of claim 19 wherein the power source component is a power cord electrically coupled to the socket.

21. The apparatus of claim 19 wherein the power source component is disposed to provide power to the socket through the hole in the bottom of the carved cucurbit.

22. A kit for use with a carved cucurbit having a top and a bottom, the kit comprising:

a support plate configured to support the bottom of the carved cucurbit thereon, the support plate having a upper surface and a lower surface;

an electrical socket adapted to receive a light source, wherein the socket is configured to be attached to the support plate, and further wherein the socket, when attached to the support plate, is disposed to be inserted up-through a hole in the bottom of the carved cucurbit when the carved cucurbit is being supported on the support plate.

23. The kit of claim 22 further comprising a cutting tool configured to cut the hole in the bottom of the cucurbit, wherein the cutting tool is configured to be selectively attachable to the support plate, and further wherein when selectively attached to the support plate, the cutting tool is disposed to be inserted up-through the hole in the bottom of the carved cucurbit when the carved cucurbit is supported on the support plate.

24. The kit of claim 23 wherein the cutting tool can be removed for use from the support plate without removing the socket from the support plate.

25. The kit of claim 23 wherein the cutting tool and the socket are separate structures, each of which is attachable to the support plate independent of the other.

26. The kit of claim 23 wherein the socket and the support plate are configured such that the socket is attached to the support plate inside of the cutting tool when the cutting tool is selectively attached to the support plate.

27. The kit of claim 26 wherein the cutting tool and the socket are not attached to each other.

* * * * *